Oct. 20, 1959 M. E. BERG 2,909,645
CONTACT TUBE FOR ARC WELDING UNIT
Filed Dec. 27, 1957
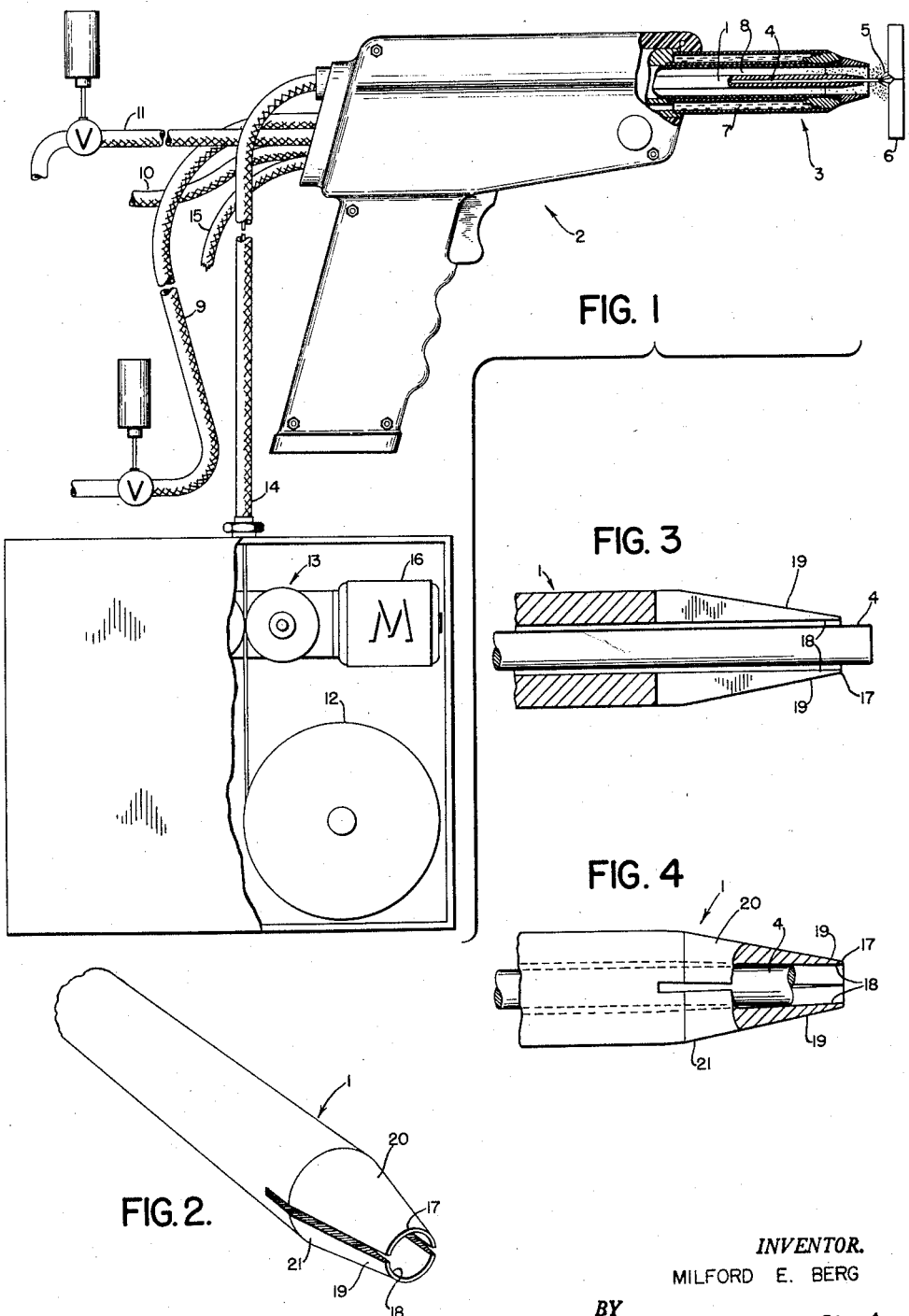
INVENTOR.
MILFORD E. BERG
BY
Andrus, Sceales & Starke
Attorneys

United States Patent Office 2,909,645
Patented Oct. 20, 1959

2,909,645

CONTACT TUBE FOR ARC WELDING UNIT

Milford E. Berg, Milwaukee, Wis., assignor to A. O. Smith Corporation, Milwaukee, Wis., a corporation of New York Application December 27, 1957, Serial No. 705,541

8 Claims. (Cl. 219—130)

This invention relates to electrode contact tubes for arc welding apparatus and particularly to a contact tube adapted to prevent weld spatter from interfering with the feed of the electrode.

In the operation of welding apparatus where a consumable electrode is fed through a contact tube to the weld area, there is a tendency for the wire to stick or freeze to the contact tube causing frequent shut downs and stoppages in the welding operation. This sticking is attributable to molten spatter striking and fusing to the contact tube and to the electrode at the point of electrode exit from the tube and actually welding the wire to the tube. The condition of spatter and spatter adherence is particularly prevalent in gas-shielded welding applications.

In accordance with the present invention, the contact tube which directs the electrode to the arc is externally tapered at the discharge end. The taper is sufficient to establish a relatively thin edge of metal at the discharge end of the contact tube. Any spatter which strikes and fuses to this thin edge of metal and to the electrode, will cause the fused portion of the tube to be readily torn from the rest of the tube by the traveling electrode without noticeably effecting the continuous electrode motion.

According to another aspect of the invention, the discharge end of the contact tube is slit longitudinally to divide the end of the tube into a pair of spring-like members. The end members are sprung or tensioned toward each other. The electrode forces the ends apart and thereby establishes an opposing tension in the members to provide a firm and constant sliding fit. The close fit prevents molten spatter from entering the running clearance between the electrode and the tube to prevent wedging of spatter therein.

Accordingly, an object of this invention is to eliminate freezing and locking of the electrode to the contact tube by reliable, simple and inexpensive means.

Other objects of the invention will appear in the course of the following description.

The drawing illustrates the best mode presently contemplated of carrying out the invention.

In the drawing:

Figure 1 is a side elevational view of a hand welding gun including a contact tube constructed in accordance with the present invention;

Fig. 2 is a fragmentary perspective view of the contact tube of Fig. 1;

Fig. 3 is an enlarged fragmentary sectional view of the contact tube of Fig. 1; and Fig. 4 is an enlarged fragmentary view, partly in section, of the contact tube of Fig. 1 on a sectional plane located at ninety degrees to Fig. 3.

Referring to the drawing, and more particularly to Figure 1, a contact tube 1 constructed in accordance with the present invention is shown for purposes of illustration assembled in a hand welding gun 2.

The illustrated welding gun 2 is of the type described and illustrated in the co-pending application of Julian A. Pierkarski and John A. Russell, entitled Arc Welding Apparatus, Serial No. 631,849, filed December 31, 1956, which application has been assigned to a common assignee with this application.

As more fully described in the referred to co-pending application, a water-cooled electrode nozzle assembly 3 forms a part of the welding gun and is supported extending forwardly from an insulating casing of the gun. The nozzle assembly 3 simultaneously directs a shielding gas and a consumable electrode 4 to an arc 5 which is established between a workpiece 6 and the end of the electrode 4.

The nozzle assembly 3 includes an annular water jacket 7 co-axially disposed about the contact tube to form a shielding gas passage 8 and connected by suitable internal conduits, not shown, to a water inlet hose 9 and discharge hose 10 to permit circulation of cooling water through the jacket. The shielding gas passage 8 is connected by suitable internal conduits, not shown, to an incoming shielding gas hose 11 which is connected to a suitable source of gas, not shown.

The consumable electrode 4 is continuously drawn from a supply reel 12 by a feed roll drive mechanism 13 and transported to the gun 2 through a cable 14. The cable connects to an electrode passage, not shown, which is located in axial alignment with the contact tube to direct the electrode through the gun and to the arc.

A welding current supply, not shown, is connected at one terminal to the contact tube within the casing by an incoming welding cable 15 at the opposite terminal to the work 6 to establish and maintain the arc incident to continuous feed of the electrode thereto.

The feed motor 16 of the drive mechanism is connected to a control circuit which energizes the motor in accordance with changes in the arc voltage. The control circuit is of any suitable variety such as shown in the co-pending application of Harold S. Lund, entitled Variable Electrode Feed for Consumable Electrode Arc Welding, Serial No. 651,001, filing date April 5, 1957, and assigned to a common assignee with the present application. As more fully described therein, the armature, not shown, of the motor 16 is connected in series with the arc voltage and a substantially greater output voltage of a constant current generator, not shown. The arc voltage and the generator voltage buck each other such that the energization of the motor, and therefore the speed of the motor is directly proportioned to the arc voltage.

As more clearly shown in Figs. 2–4, an external taper is formed on the discharge end 17 of the contact tube 1 by grinding or any other suitable means to establish a feather-like edge at the immediate electrode discharge or arc end thereof. Although the centrally disposed passage in the tube necessarily makes the end of the tube appear to be blunt in nature, the cross-sectional views of Fig. 2–4 illustrate that the inner and outer surfaces 18 and 19, respectively, of the tube wall merge to form a relatively thin portion of metal surrounding the electrode at the arc end of the tube. In the event molten spatter from the arc firmly adheres to the electrode 4 and the end of the contact tube 17, the adhering portion of the thin tube edge is readily torn from the rest of the tube by the electrode 4 and allows the same to advance to the weld area without noticeable interruption in feed.

In feathering the end of the contact tube 1, certain rigidity in the tube end is necessary to prevent the tube end from bending due to lateral movement of the electrode 4, for example, such as may occur if the electrode 4 freezes to the weld and is forced against the tube by the operator in freeing the electrode from the weld. On the other hand, a minimum thickness of metal at the discharge end of the contact tube 1, corresponding to the necessary rigidity, allows rapid and ready removal of that portion of the contact tube adhering to the spatter from the rest of the tube. If the thickness is increased to any great extent, a noticeable interruption in the feed to the arc 5 occurs before the pulling force exerted by the electrode 4 is able to dislodge a portion of the contact tube 1. The arc length then increases which raises the arc voltage. The increased arc voltage raises the speed of the drive motor 16 and correspondingly the rate of electrode feed until normal arc voltage is again established. However, due to inertia in the drive motor 16 and the feed roll mechanism 13, some hunting of the drive mechanism is established. The degree of hunting is generally related to the period of interruption which depends upon the time taken for the electrode 4 to tear from the contact tube 1.

According to the invention any angle of taper is acceptable which provides the tube end with a thin edge of metal susceptible of being readily torn from the rest of the tube by the passing electrode. This structure could also be achieved by utilizing a tube having parallel external surfaces provided that the walls are relatively thin at the electrode exit end of the tube.

The contact tube 1 is normally formed of copper or some other relatively inexpensive conducting material which is readily available in standard tubular form. As the contact tube is not a precision machined member, a relatively large tolerance on the internal diameter of the contact tube 1 is allowed. Contact is maintained with the electrode 4 due to the flexibility of the electrode which travels through the contact tube in a tortuous path. Such a clearance at the discharge end of a contact tube allows molten spatter to enter the annular shaped passage formed about the electrode 4 by the inner wall of the contact tube 1. Spatter entering the contact tube through this passage is carried outwardly by the electrode 4 which forms the spatter into rolling balls due to the normal forward motion of the electrode. However, minute portions of the spatter continuously adhere to the inner surface of the contact tube 1, thereby decreasing the inner diameter of the tube and reducing the normal clearance between the electrode 4 and the tube 1. Eventually this clearance is decreased to an extent which tends to prohibit the "balls" of spatter from rolling out of the tube 1 and instead, cause the "balls" to wedge between the contact tube 1 and electrode 4, even to the degree of completely stopping the electrode feed. Although complete stoppage of electrode feed does not always result, the wedging effect is sufficient to momentarily retard the rate of electrode feed and to interfere with normal operation of the welding apparatus, particularly in applications requiring high rates of electrode feed.

To prevent this effect, according to the invention the tube end 17 is slit longitudinally from the end of the tube rearwardly along diametrically opposite sides of the tube to divide the discharge end of the contact tube 1 into two separate leaf-spring portions 20 and 21, as shown in Fig. 2. The leaf-spring portions of the tube are forced inwardly to set them biased to partially close the slits as shown in Fig. 4. When the electrode is passed through the contact tube 1, it spreads the leaf-spring portions and increases the tension in the latter. The discharge end of the contact tube 1 then firmly grips the electrode and closes the end of the annular passage formed about the electrode by the contact tube 1. Spatter is thus prevented from entering between the contact tube and the electrode.

The slitting and subsequent closing of the slits of the tube end not only closes off the tube end to the entry of molten spatter, but also provides good electrical contact between the tube and the electrode to maintain a strong steady signal to the electrode 4, and thereby promotes formation of a homogeneous high quality weld.

In the event spatter enters the tube 1 due to relative outward movement of the two sections away from the electrode 4 and the spatter "balls-up" as previously described, the sections of the slit end of the tube 1 are free to move outwardly relative to each other to allow the "ball" to roll out of the tube, thus allowing the electrode 4 to continue its motion.

The tube of the invention is particularly adapted for use in gas-shielded arc welding applications and more particularly where the shielding gas is carbon dioxide because of the resulting increased weld spatter formed at the weld area.

The present invention provides a simple and inexpensive arc welding contact tube which substantially minimizes interference with electrode feed by locking of the electrode and the contact tube.

Various modes of carrying out the invention are contemplated as being within the scope of the following claims particularly pointing out and distinctly claiming the subject matter which is regarded as the invention.

I claim:

1. In an arc welding apparatus adapted to continuously feed a consumable electrode to an arc, a metallic contact tube adapted to permit said electrode to pass therethrough, and means adapted to support said contact tube adjacent the weld area with one end thereof disposed within the weld spatter area, said end being provided with a relatively thin wall to permit ready removal of portions of said wall incident to welding thereof to the electrode by weld spatter.

2. In gas shielded arc welding apparatus wherein a consumable electrode is fed to the weld area, a metallic contact tube adapted to allow said electrode to pass therethrough, and means to support the contact tube adjacent the weld area with the discharge end of said tube disposed within the weld spatter area, said discharge end being tapered to a feather edge such that a relatively thin edge of metal surrounds said electrode at the tube end to allow ready removal of portions of said discharge end from said tube by the passing electrode incident to welding thereof to the discharge end by the weld spatter.

3. In an arc welding apparatus wherein a metallic contact tube having a forward and a rearward end relative to a weld area is adapted to pass a consumable electrode to the weld area, an outer surface on the forward end of said tube tapered radially inwardly in the direction of the forward end of said tube to provide a relatively thin edge of metal surrounding said electrode at the forward end of said tube to allow ready removal of portions of said thin edge by the passing electrode incident to welding thereof to said thin edge, and means adapted to support the contact tube with the forward end immediately adjacent the weld area.

4. In an arc welding apparatus wherein a consumable electrode wire is advanced to the weld area, a metallic contact tube adapted to pass said electrode therethrough and having one end thereof tapered to a feather edge to allow ready removal of portions of the tapered end from the rest of the tube end by the passing electrode incident to welding thereof to the tube end by weld spatter, said tapered end being provided with a longitudinal slit extending inwardly of the tube from the tapered end thereof.

5. The apparatus of claim 4 wherein the slit in the tapered end of said tube is partially closed to tightly grip the passing electrode.

6. In a gas-shielded arc welding apparatus adapted to continuously feed a consumable electrode to an arc, a metallic contact tube adapted to pass said electrode therethrough and having a forward and a rear end relative to said arc, said forward end being slit to provide at least two spring leaf sections which are biased inwardly relative to said electrode to tightly grip the same, said forward end being further provided with a feather edge to permit ready removal of portions of said edge incident to welding thereof to the electrode.

7. A metallic contact tube adapted to guide a consumable electrode to a gas-shielded arc and having a forward and a rear end relative to said weld area which comprises an outer surface on the forward end of the tube converging in the direction of said forward end to provide a relatively thin edge of metal thereat with portions of said thin edge adapted to be readily removed from the rest of the tube by the passing electrode incident to welding of the latter to said thin edge, and means adapted to secure the contact tube with the forward end adjacent the weld area.

8. A metallic contact tube adapted to guide a consumable electrode to a gas-shielded arc and having a forward and a rear end relative to the arc which comprises an outer surface on the forward end of the tube converging in the direction of said forward end to provide a relatively thin portion of metal thereat, said forward end being provided with a slit extending rearwardly from the forward end of the tube, and means adapted to secure the contact tube with the forward end adjacent the weld area.

References Cited in the file of this patent

UNITED STATES PATENTS 2,544,711    Mikhalapov _____ Mar. 13, 1951